United States Patent
Roesgen et al.

(10) Patent No.: US 7,281,553 B1
(45) Date of Patent: Oct. 16, 2007

(54) TIRE WITH COMPRESSION-BEARING HOOP STRUCTURE

(75) Inventors: Alain Emile Francois Roesgen, Luxembourg (LU); Laurent Colantonio, Bastogne (BE); Filomeno Gennaro Corvasce, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/149,007

(22) PCT Filed: Dec. 14, 1999

(86) PCT No.: PCT/US99/29540

§ 371 (c)(1),
(2), (4) Date: May 31, 2002

(87) PCT Pub. No.: WO01/43994

PCT Pub. Date: Jun. 21, 2001

(51) Int. Cl.
*B60C 17/00* (2006.01)
*B60C 9/18* (2006.01)

(52) U.S. Cl. .................. 152/197; 152/516; 152/517; 152/526; 152/532; 152/537; 152/538

(58) Field of Classification Search ............... 152/197, 152/516, 517, 526, 532, 538, 537
See application file for complete search history.

(56) References Cited

U.S. PATENT DOCUMENTS

| | | |
|---|---|---|
| 1,678,211 A | 7/1928 | Davidson |
| 1,698,414 A | 1/1929 | Palmer |
| 2,811,998 A * | 11/1957 | Bourdon ............... 152/537 X |
| 2,884,040 A * | 4/1959 | Saint-Frison et al. ... 152/538 X |
| 3,717,191 A * | 2/1973 | Harrington et al. ......... 152/532 |
| 3,983,919 A * | 10/1976 | Messerly ................... 152/517 |
| 4,091,856 A | 5/1978 | Jackson |
| 4,111,249 A | 9/1978 | Markow |
| 4,284,116 A | 8/1981 | Sato et al. |
| 5,368,082 A | 11/1994 | Oare et al. |

(Continued)

FOREIGN PATENT DOCUMENTS

DE 3401016 2/1985

(Continued)

OTHER PUBLICATIONS

English machine translation of WO 94/25297.*

(Continued)

*Primary Examiner*—Adrienne C. Johnstone
(74) *Attorney, Agent, or Firm*—Howard M. Cohn

(57) ABSTRACT

A pneumatic radial ply tire incorporating a crown reinforcing structure comprises at least one reinforcing hoop located approximately on the equatorial plane and disposed radially inward of the tread and radially outward of the carcass structure. The hoop is surrounded or encased by a layer of elastomeric transition material providing a flexible structural connection between the hoop and the adjacent carcass structure and belt structure. The hoop may have a substantially lenticular shape, or a complex shape with two thickened sections or lobes connected by a thin waist-like section, or a shape and a location that is asymmetric with respect to the equatorial plane of the tire, and may be made by winding a thin strip of material such as UHMWPE in an elastomeric matrix. The hoop may replace the belt structure of the tire.

11 Claims, 6 Drawing Sheets

U.S. PATENT DOCUMENTS

| | | |
|---|---|---|
| 5,685,927 A | 11/1997 | Hammond et al. |
| 6,338,374 B1 | 1/2002 | Nguyen et al. |

FOREIGN PATENT DOCUMENTS

| | | | |
|---|---|---|---|
| EP | 0 101 400 A2 * | 2/1984 | ......... 152/526 |
| EP | 0729853 | 9/1996 | |
| EP | 0853009 | 7/1998 | |
| GB | 2002699 | 2/1979 | |
| JP | 63141809 A * | 12/1986 | ......... 152/517 |
| WO | WO94/25297 | 11/1994 | |

OTHER PUBLICATIONS

Webster's New World Dictionary of American English, ed. Victoria Neufeldt and David Guralnik, Simon & Schuster, Inc., New York, p. 773.*

The Principles of Engineering Materials, Craig Barrett et al., Prentice-Hall, Inc., Englewood Cliffs, New Jersey, 1973, pp. 10-11.*

* cited by examiner

TIRE WITH COMPRESSION-BEARING HOOP STRUCTURE

TECHNICAL FIELD

The present invention relates to a pneumatic radial ply tire and more specifically to a tire incorporating a compression-bearing hoop structure disposed more or less in the equatorial plane and beneath the tread.

BACKGROUND OF THE INVENTION

Various methods have been devised for enabling the safe, continued operation of unpressurized or underpressurized vehicle tires with the intent of minimizing further damage to the uninflated tire and without compromising vehicle handling over a distance from the place where the tire lost its pressure to a place, such as a service station, where the tire can be repaired or replaced. Pneumatic tires designed for sustained operation under conditions of unpressurization or underpressurization are also called runflat tires, as they are capable of being driven in the uninflated or "flat" condition.

One approach to runflat tire design is described in U.S. Pat. No. 4,111,249, entitled the "Banded Tire," in which a relatively thin annular band approximately as wide as the tread is deployed radially inward of the tread. The band behaves as a structural flexible-arch compression member allowing coacting tension loads in the sidewalls to act over a substantial portion of the circumference of the sidewalls during unpressurized operation. As described by European Patent No. EP 0 853 009 A2, banded tires have been fabricated with band materials made of steel, aluminum, titanium, and epoxy and thermoplastic composites with glass, Kevlar, and graphite fiber reinforcement. The common failure mode with the light, economical laminate band construction is interlaminar shear within the band's primary neutral bending axis.

Another approach to the design of runflat tires is to strengthen the sidewalls. For example, U.S. Pat. No. 5,368,082 ('082) discloses a low aspect runflat pneumatic radial ply tire, which employs special sidewall inserts to improve the stiffness and strength of the sidewalls permitting the tire to be driven while uninflated. Due to the large amounts of rubber required to stiffen the sidewall members, heat buildup due to flexure of the sidewalls is a major factor in tire failure, especially when the uninflated tire is operated for prolonged periods at high speeds.

The design of runflat tires relying primarily on thickened sidewalls is even more problematic when applied to high-aspect-ratio tires for large luxury touring sedans. These taller sidewalled tires, having aspect ratios in the 55% to 65% range or greater, means that the sidewall bending stresses are greater than that of the earlier low-aspect-ratio runflat tires disclosed in the '082 patent. Thus the sidewalls of high profile tires may require stiffening to the point of compromising ride characteristics. Luxury vehicle owners generally do not wish to sacrifice ride quality for runflat capability.

Thickened sidewalls also contribute to the problem of tread buckling during runflat operation. When the tire is uninflated, the vehicle load is transmitted from the sidewalls primarily to the edges of the tread footprint while the center of the footprint remains essentially unloaded. Moreover, as the thickened sidewalls bulge under the load of the vehicle weight, they tend to transmit bending stresses to the tread. The result is that the tread, in the central portion of its footprint, tends to buckle upward from the ground. This tread buckling reduces the area of tread in contact with the ground, resulting in compromised vehicle handling, as well as reduced runflat tread life. One approach to control tread buckling under runflat conditions is to increase the lateral and circumferential stiffness of the tread structure by incorporating wedge inserts in various locations beneath the tread, belts and carcass to control runflat tread buckling. An examples of a reinforced tread is described in PCT Patent Application PCT/US98/06004 filed 26 Mar. 1998.

U.S. Pat. No. 5,685,927, ('927) discloses a runflat tire comprising at least three annular bead cores located coaxially with respect to the axis of rotation. The first and second bead cores are located radially inwardly of each sidewall. At least one additional bead core is located under the tread radially inwardly of each pair of reinforcing belts and the radially outwardly of the first and second bead cores and a carcass reinforcing structure. In addition, '927 shows a reinforced sidewall construction that is substantially thinner than predecessor type runflat tires. This thin sidewall construction is made possible by the employment of the additional third bead. The additional bead core not only keeps the tread package unbuckled when the tire is operated under load and uninflated, it actually contributes to the load carrying capacity of the tire.

The design of an optimum runflat tire presents a complex challenge where multiple design criteria should be considered simultaneously. A runflat tire should provide a structure sufficient to support the vehicle weight without air pressure. The tread should resist buckling in the area of its contact with the road to provide adequate and consistent traction. In addition, the tire should provide a comfortable ride while either in the inflated or uninflated condition. Finally all these areas of performance should be addressed while minimizing the additional weight of the tire, the complexity of its construction and its cost.

OBJECTS OF THE INVENTION

It is an object of the present invention to provide a runflat radial tire as defined in one or more of the appended claims and, as such, having the capability of being constructed to accomplish one or more of the following subsidiary objects.

One object of the present invention is to provide a runflat radial tire having a circumferentially stiffened tread providing tread contact pressure with the ground at the center of the footprint for improved handling and reduced tread wear during runflat operation and normal inflated operation.

Another object of the present invention is to provide a runflat radial tire having a circumferentially stiffened tread resisting the tendency of the tread to buckle upward at the center of the footprint for improved handling and tread durability during runflat operation.

Still another object of the present invention is to provide a runflat radial tire having a compression-bearing hoop structure allowing a reduction in the weight of sidewall reinforcing inserts required to support a given vehicle weight during runflat operation, thus minimizing the total weight of the tire.

Yet another object of the present invention is to provide a runflat radial tire having a compression-bearing hoop structure allowing a reduction in the rigidity of carcass structure required to support a given vehicle weight during runflat operation, thus improving the ride comfort and quality during normally inflated operation.

SUMMARY OF THE INVENTION

The present invention relates to a pneumatic radial runflat tire having a tread, a belt structure, a carcass structure with at least one radial ply, two sidewalls each typically with at least one reinforcing insert, two inextensible annular beads and a crown reinforcing structure comprising at least one reinforcing hoop located approximately on the equatorial plane and disposed radially inward of the tread and radially outward of the carcass structure. The hoop is surrounded or encased by a layer of elastomeric transition material providing a flexible structural connection between the hoop and the adjacent carcass structure and belt structure. The reinforcement hoop stiffens the tread against buckling during runflat operation and contributes to the runflat load carrying capacity of the tire. The additional runflat load carrying capacity provided by the hoop allows for the elimination or reduction in the thickness and weight of the reinforcement inserts in the sidewalls of the tire. The reduction in the thickness of the reinforcing inserts also reduces the rigidity of the sidewalls providing the tire with improved ride and handling characteristics during normal inflated operation.

In one embodiment of the invention, the reinforcement hoop is made with a substantially lenticular shape that is symmetrical with respect to the plane of the hoop. The hoop is located radially inward of the belt structure and radially outward of the carcass structure and is centered about the equatorial plane of the tire. The width of the hoop, measured in the axial direction, is less than 50% and preferably between 10% and 25% of the tread width. The thickness of the hoop, measured in the radial direction, is at least 10% and preferably from 10% to 50% of the width of the hoop. The hoop of this embodiment is made of a fiber reinforced, thermoplastic material although a variety of suitably rigid materials with or without fiber reinforcement could be used.

In a second embodiment of the invention, the hoop has a complex shape with two thickened sections or lobes connected by a thin waist-like section. The location of the hoop of the second embodiment and its cross-sectional shape are symmetric with respect to the equatorial plane of the tire.

In a third embodiment of the invention, the hoop has a shape and a location that is asymmetric with respect to the equatorial plane of the tire. The hoop has a thickened section to one side of the equatorial plane and a thin section to the opposite side the equatorial plane.

In a fourth embodiment of the invention, the hoop replaces the belt structure. The hoop is disposed radially inward of the tread and radially outward of the carcass plies. The hoop has a width, measured in the axial direction, exceeding 75% and preferably 90% to 100% of the width of the tread. The thickness of the hoop, measured in the radial direction, is not greater than 10%, and preferably 2.0% to 5.0% of the width of the hoop. The hoop of this embodiment provides the function of the belt structure in addition to providing the tire with extended runflat capability.

In a fifth embodiment of the invention, the hoop is made by winding a thin strip of material such as UHMWPE in an elastomeric matrix to build a hoop of the desired cross-sectional shape.

Hoop materials contemplated for the present invention include thermoplastics, ultra-high-molecular-weight polyethylene (UHMWPE) and epoxy resin composites and combinations thereof. Each of the latter materials can be filled with reinforcing fibers where the fibers are of the class of high modulus materials that include steel, glass, nylon, rayon, polyester, aramid, carbon fibers and combinations thereof.

One possible embodiment contemplates the use of reinforcing fibers having a more or less circumferential orientation but in a slackened state such that they provide only a small resistance to small deformations and a large resistance to larger deformations.

BRIEF DESCRIPTION OF THE DRAWINGS

Reference will be made in detail to preferred embodiments of the invention, examples of which are illustrated in the accompanying drawings. The drawings are intended to be illustrative, not limiting.

Certain elements in selected ones of the drawings may be illustrated not-to-scale, for illustrative clarity.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract.

In some cases, similar elements may be referred to with similar numbers in a single drawing. For example, a plurality of elements 199 may be referred to as 199*a*, 199*b*, 199*c*, etc.

The cross-sectional views presented herein may be in the form of "slices", or "near-sighted" cross-sectional views, omitting certain background lines which would otherwise be visible in a true cross-sectional view, for illustrative clarity.

Figure 1:
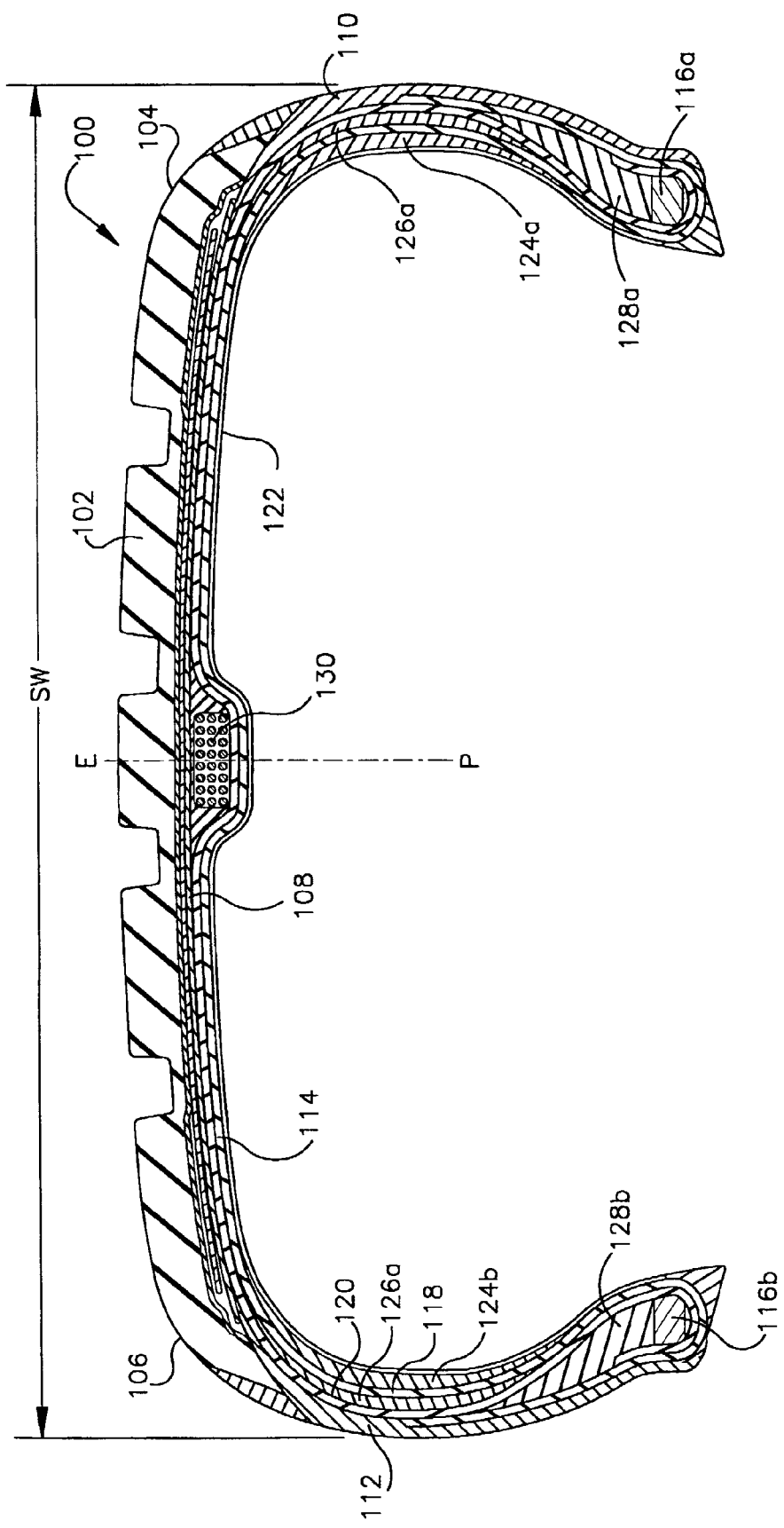
Figure 2:
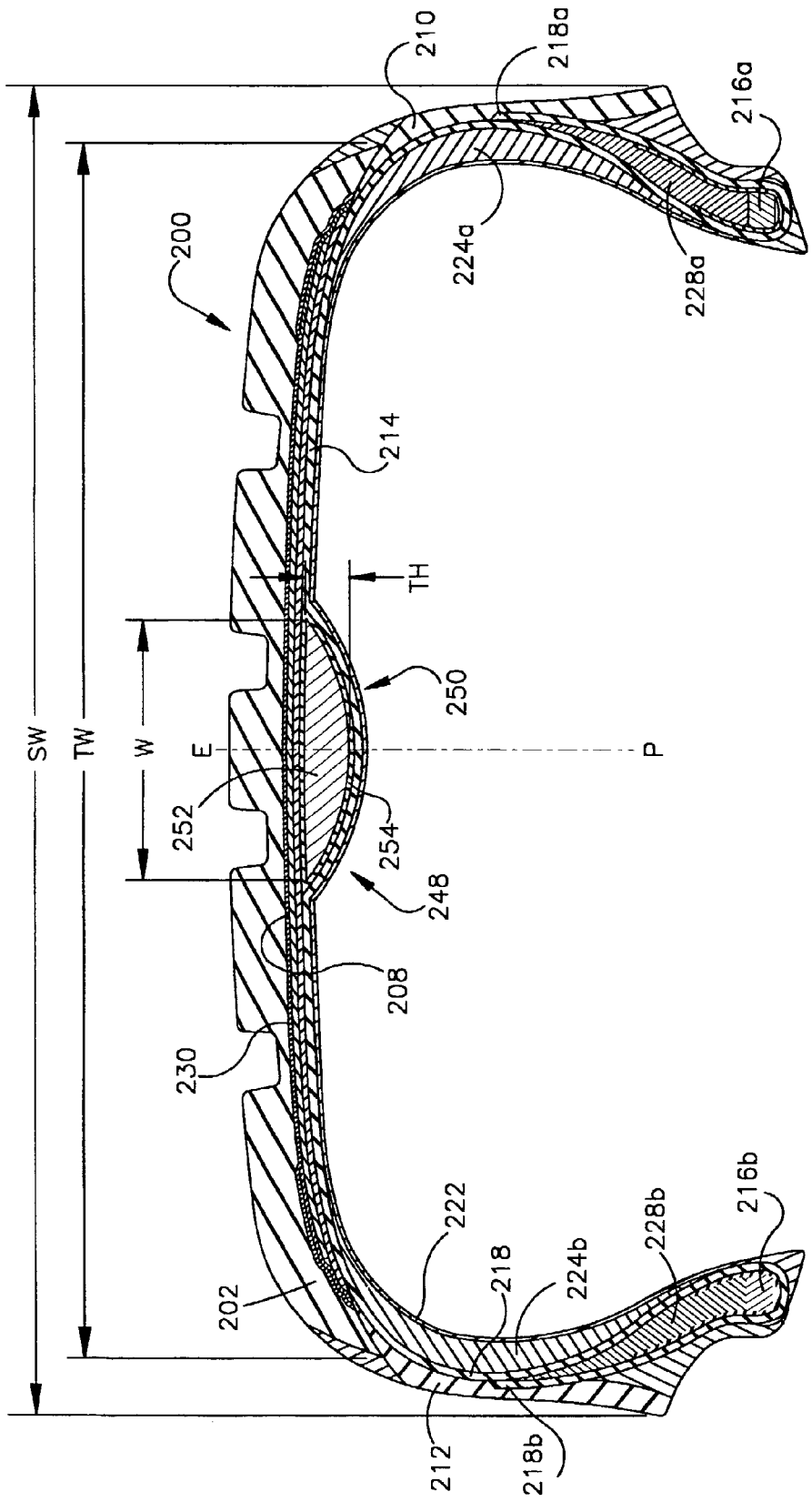
Figure 3:
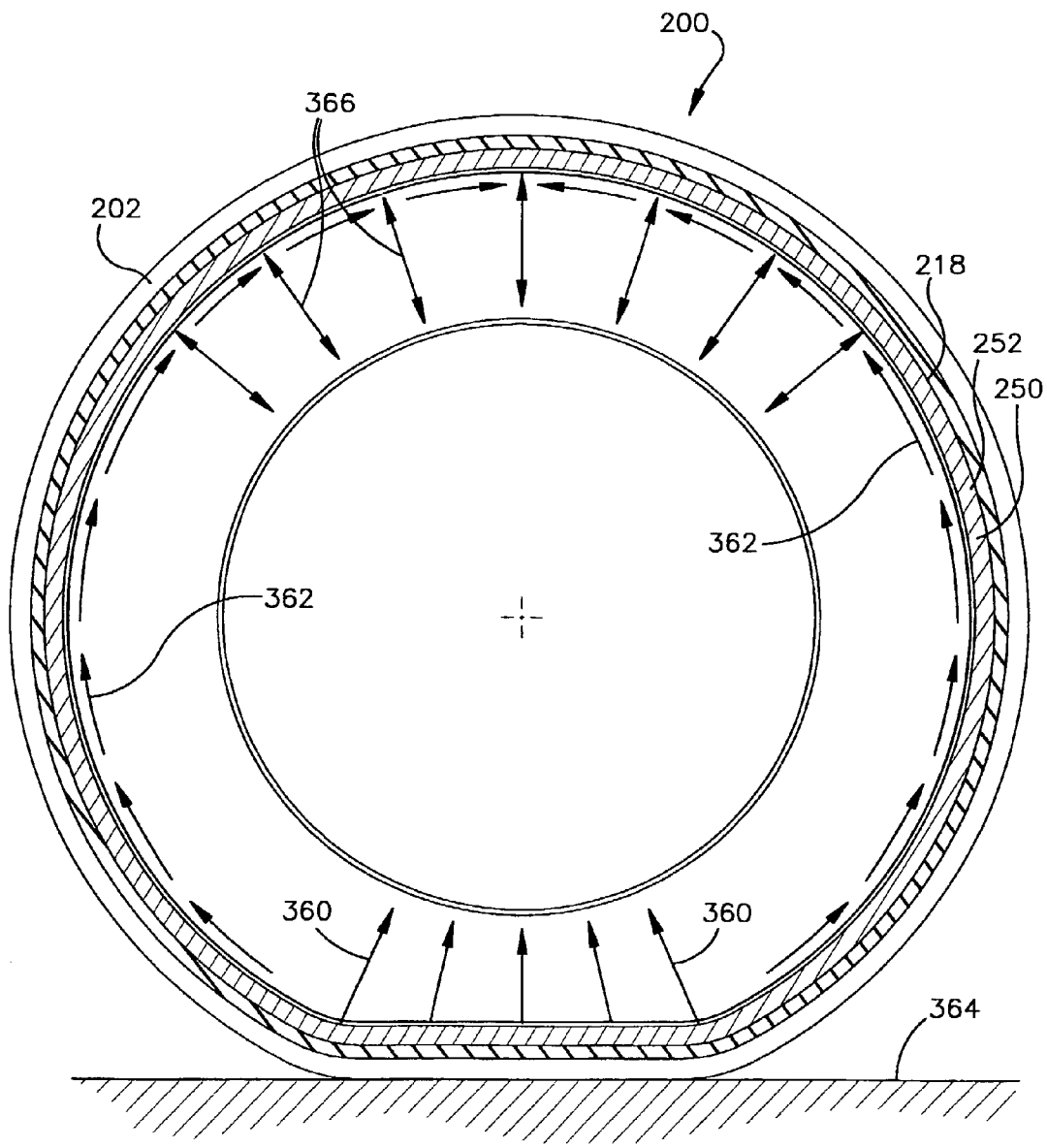
Figure 4:
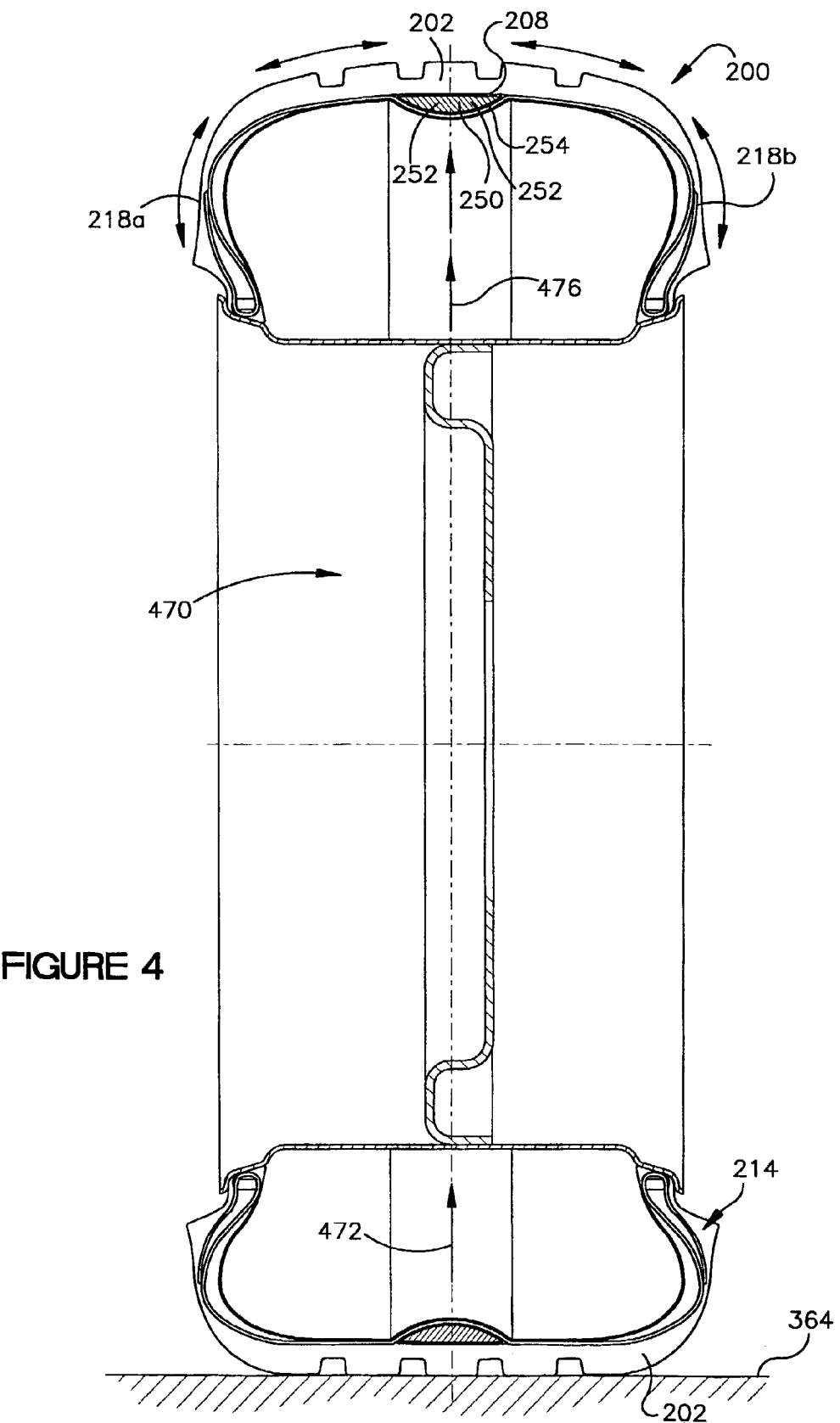
Figure 5:
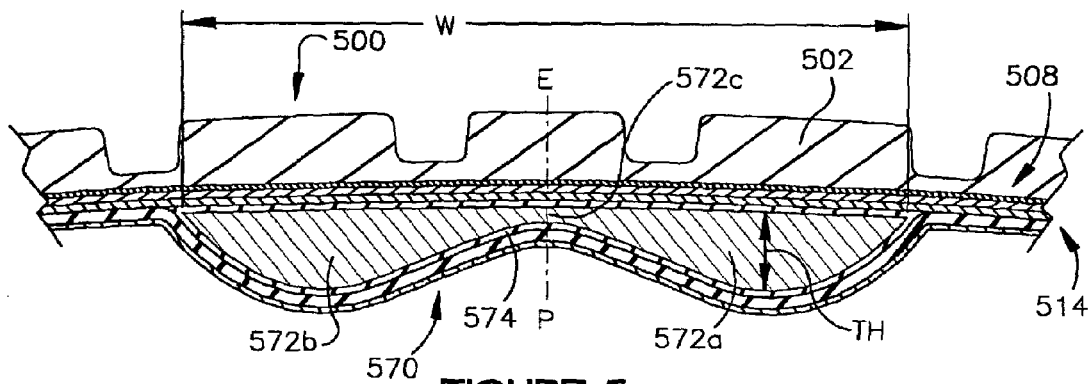
Figure 6:
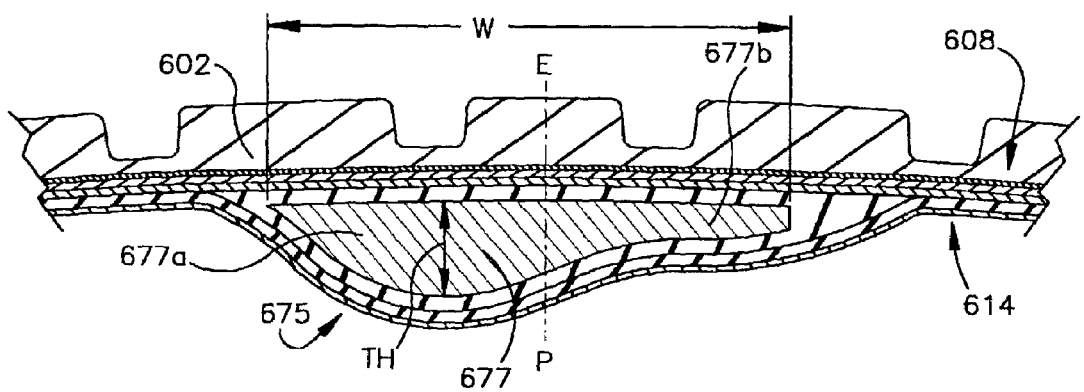
Figure 7:
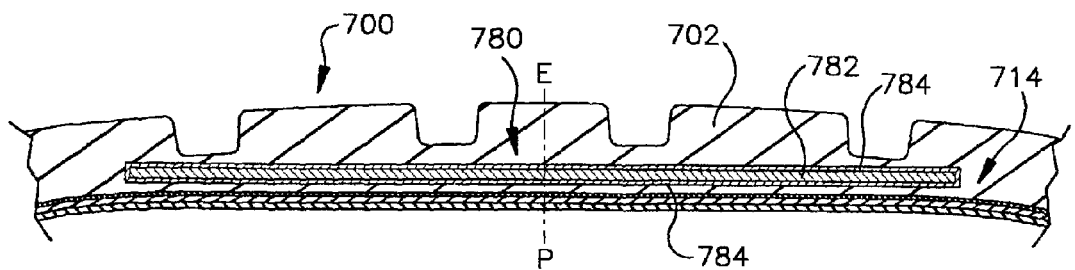
Figure 8:
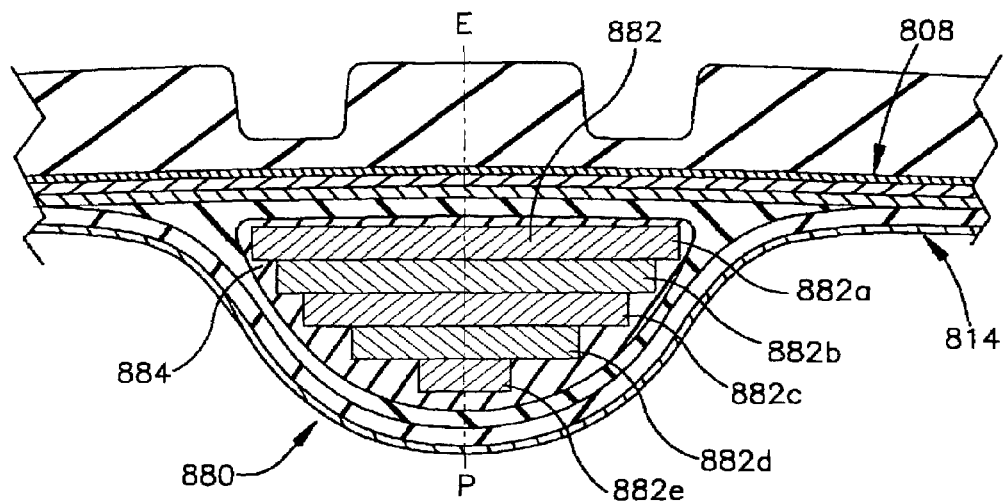
Figure 9:
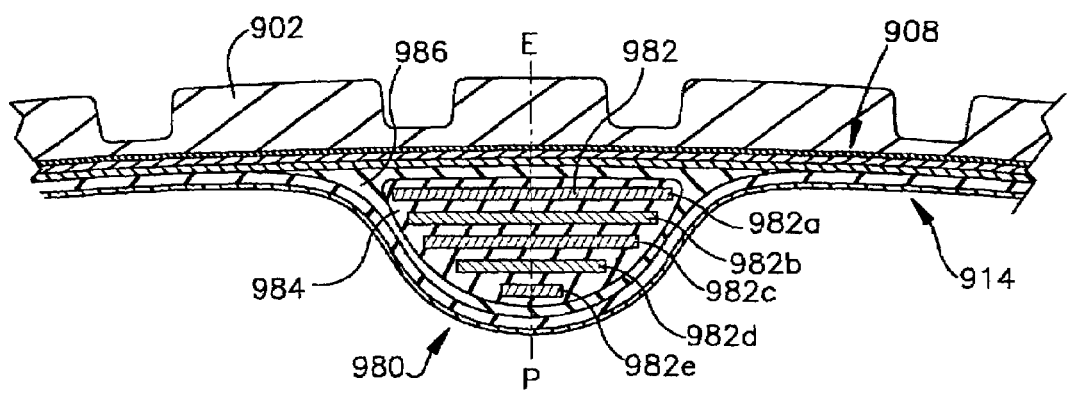

The structure, operation, and advantages of the present preferred embodiment of the invention will become further apparent upon consideration of the following description taken in conjunction with the accompanying drawings, wherein:

FIG. 1 is a cross-sectional view of a prior art runflat tire as disclosed in U.S. Pat. No. 5,685,927;

FIG. 2 is a cross-sectional view of a first embodiment of the present invention incorporating a hoop structure with a symmetrical shape and placement;

FIG. 3 is a cross-sectional schematic view through the equatorial plane of the tire mounted on a wheel showing the transfer of forces from the footprint to the hoop and the carcass structure during runflat operation;

FIG. 4 is a cross-sectional schematic view through the meridional plane of the tire mounted on a wheel illustrating the transfer of forces from the footprint to the belt and carcass structures 180 degrees from the footprint;

FIG. 5 is a cross-sectional view of a second embodiment of the present invention incorporating a double lobed hoop with symmetrical shape and placement;

FIG. 6 is a cross-sectional view of a third embodiment of the present invention incorporating a hoop with an asymmetrical shape and placement;

FIG. 7 is a cross-sectional view of a fourth embodiment of the present invention incorporating a hoop in a tire without a belt structure;

FIG. 8 is a cross-sectional view of a fifth embodiment of the present invention incorporating a hoop made by winding a thin flat strip; and FIG. 9 is a cross-sectional view of a sixth embodiment of the present invention incorporating a hoop made of a plurality of flat hoops.

DEFINITIONS

"Apex" means an elastomeric filler located radially above the bead core and between the plies and the turnup plies.

"Aspect Ratio" means the ratio of the section height of a tire to its section width; also refers to the cross-sectional profile of the tire; a low-profile tire, for example, has a low aspect ratio.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure means at least two annular layers or plies of parallel cords, woven or unwoven, underlying the tread, unanchored to the bead, and having both left and right cord angles in the range from 18 degrees to 30 degrees relative to the equatorial plane of the tire.

"Carcass" means the tire structure apart from the belt structure, tread, undertread over the plies, but including the beads.

"Equatorial Plane" means the plane perpendicular to the tire's axis of rotation and passing through the center of its tread; or the plane containing the circumferential centerline of the tread.

"EMT tire" means "extended mobility technology tire," which means the same as "runflat tire."

"Inner Liner" means the layer or layers of elastomer or other material that form the inside surface of a tubeless tire and that contain the inflating fluid within the tire.

"Insert" means the crescent-shaped or wedge-shaped reinforcement typically used to reinforce the sidewalls of runflat-type tires.

"Lateral" means a direction parallel to the axial direction.

"Modulus of Elasticity" is the ratio of stress to strain, where stress is the force per unit area and strain is the deformation per unit length.

"Modulus" means Modulus of Elasticity

"Neutral Bending Axis" means the imaginary plane passing through a material separating areas of compressive stress from areas of tensile stress.

"Normal Inflation Pressure" means the specific design inflation pressure at a specified load assigned by the appropriate standards organization for the service condition for the tire.

"Normal Load" means the specific design inflation pressure and load assigned by the appropriate standards organization for the service condition for the tire.

"Ply" means a cord-reinforced layer of rubber coated radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65 degrees and 90 degrees with respect to the equatorial plane of the tire.

"Radial Ply Tire" means a belted or circumferentially-restricted pneumatic tire in which at least one ply has cords which extend from bead to bead are laid at cord angles between 65 degrees and 90 degrees with respect to the equatorial plane of the tire.

"Runflat" means that the tire structure alone is sufficiently strong to support the vehicle load when the tire is operated in the uninflated condition, the sidewall and internal surfaces not collapsing or buckling onto themselves, without requiring any internal devices to prevent the tire from collapsing.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Thermoplastic", means a category of plastic materials that can be molded with a combination of heat and pressure.

"Tread width" means the arc length of the tread surface in the plane includes the axis of rotation of the tire.

"Wedge Insert" means the same as "Insert."

DETAILED DESCRIPTION OF THE PREFERRED EMBODIMENT

Prior Art Embodiment

Referring to FIG. 1 there is illustrated a prior art runflat tire 100 made in accordance with U.S. Pat. No. 5,685,927 ('927). The tire has an annular tread 102 with tread edges 104,106, at least two reinforcing belts 108 located radially inwardly of the tread 102, a pair of sidewalls 110,112 extending radially inwardly from each tread edge 104,106, respectively, a maximum section width (SW) and a tire carcass structure 114. The tire carcass structure 114 has at least two annular bead cores 116a,116b, a first ply 118 and a second ply 120, an inner liner 122, a first pair of inserts 124a,124b, a second pair of inserts 126a,126b and bead apex fillers 128a,128b. The carcass structure 114 extends meridionally about tire 100 from the first bead core 116a to the second bead core 116b. The inner liner 122 is located radially inward of the first ply 118.

The first or innermost crescent shaped inserts 124a,124b are located between the first ply 118 and the inner liner 122. The second or outermost crescent shaped inserts 126a,126b are located between the first ply 118 and the second ply 120. The first and second crescent shaped inserts 124a,124b, 126a,126b extend from a location radially inward of the radially outer end of the bead apex fillers 128a,128b to a location beneath the reinforcing belts 108 substantially radially inward of the lateral tread edges 104,106.

Located coaxially with respect to the first and second bead cores 116a,116b, one additional bead core 130 is located under the tread 102 radially inward of the reinforcing belts 108 and radially outward from the first and second bead cores 116a,116b and the carcass structure 114. The additional bead core 130 is located more or less centered about the equatorial plane E-P of the tire 100.

FIG. 2 illustrates a tire 200 incorporating a hoop structure 250 in accordance with a first embodiment of the present invention. The tire 200 has the same general construction as the prior art runflat tire shown in FIG. 1 except for the elimination of the bead core 130 which is replaced with a crown reinforcement structure 248 which includes a hoop structure 250. The tire 200 is provided with a circumferential tread 202 (compare 102), a pair of sidewalls 210,212 (compare 110,112) and bead regions with bead cores 216a,216b, respectively.

The tire 200 is provided with a carcass structure 214 (compare 114) which includes at least one reinforcing ply 218 (compare 118) with parallel oriented cords at an angle of at least 75 degrees with respect to the equatorial plane EP of the tire 200. In the particular embodiment illustrated, the cords are oriented at an angle of 90 degrees with respect to the equatorial plane EP. The cords may be made of any material normally used for the cord reinforcement of rubber articles, for example and not by way of limitation, steel cord, carbon fiber, rayon, nylon and polyester.

The tire 200 is provided with a belt structure 208 (compare 108) located radially inward of the tread 202 and radially outward of the carcass structure 214, which in this instance includes a single ply 218 (compare 118). The belt structure 208 is comprised of one or more belts, each provided with reinforcing cords having a more or less circumferential orientation. It is to be understood that the belt structure 208 may comprise any number of belt plies of any desired configuration and the cords may be disposed at any desired angle.

As in conventional high performance type tires, the tires according to the present invention may enhance their high speed performance by the application of a fabric overlay layer 230 circumferentially disposed about the tread reinforcing belt structure 208. It is to be understood that the fabric overlay layer 230 may comprise any number of plies and types of cord materials and methods of assembly.

The tire 200 is provided with reinforcing apex fillers 228a,228b extending radially outward from each bead core 216a,216b, respectively. The sidewalls 210,212 can also be provided with at least a first pair of inserts 224a,224b, respectively, (compare 124a,124b) disposed between the inner liner 222 and the inner ply 218. The inserts 224a,224b are typically of a crescent shape. If the carcass structure 214 is provided with a second or outer ply (not shown), then the tire 200 may also be provided with a second pair of inserts (not shown) disposed between the first ply 218 and the second ply. The apex fillers 228a,228b and the inserts 224a,224b are each comprised of elastomeric materials characterized by physical properties which enhance their utilization in runflat tires, as extensively described in EP-A-729,853, incorporated by reference in its entirety herein. It is important that the rubber composition have the properties of relatively high stiffness and low hysteresis providing a high modulus of elasticity familiar to those skilled in the art of runflat tire construction relying on thickened sidewalls.

One of the inventive features of the present invention illustrated in FIG. 2 is the crown reinforcement structure 248 being of a solid, compression-bearing hoop structure 250 disposed radially inward of the belt structure 208 and radially outward of the carcass 214 more or less centered about the equatorial plane EP. The embodiment of the invention illustrated in FIG. 2 incorporates a simple symmetric hoop 252 having a generally lenticular cross-sectional shape, convex on the radially inward side, that is centered about the equatorial plane EP. The hoop 252 is structurally coupled with the belt structure 208 and the carcass structure 214 by a layer 254 of an polymeric transition or coupling material, which is typically selected from a rubber compound having a Shore A hardness between 45 and 80 and preferably between 65 and 75. The purpose of the coating 254 is to ensure good adhesion between the hoop 252 and the remainder of the structure. The hoop 252 has a width w of between 10% and 25% of the tread width tw and a thickness th of between 10% and 50% of the hoop width w. If the width w were more than 50% of the tread width, the tread would become too stiff, while if the thickness were less than 10%, the hoop could buckle axially and would be insufficiently tensionally coupled to the sidewall. Likewise if the thickness th were more than 50% of the hoop width, then it can induce too much stress resulting in premature fatigue failure and the tire might be too rigid to deflect. If the thickness th were less than 10% of the hoop width tw, then it won't be stiff enough to maintain tire shape during runflat operation.

FIGS. 5 through 8 illustrate a variety of other cross sectional shapes and placements for several other embodiments of the present invention, as described in more detail hereinbelow.

The hoop 252 can be made from a thermoplastic of any solid material or composite of materials providing the appropriate combination of strength and stiffness. The hoop 252, besides being solid, does not include a reinforcement cord, i.e. several or more turns of steel or textile cord, and can be differentiated from the European Patent Application DN 1998-222EP, entitled "Tire with Improved Run-Flat Design", having a common assignee with the present invention, and incorporated in its entirety by reference herein. Hoop materials contemplated for the present invention include thermoplastics, ultra-high-molecular-weight polyethylene (UHMWPE) and epoxy resin composites filled with reinforcing fibers where the fibers are of the class of high modulus materials that include steel, glass, nylon, rayon, polyester, aramid or carbon fibers. Preferably the reinforcing fibers would be disposed with a more or less circumferential orientation. The reinforcing fibers can also be laid in a slackened state such that the fibers make only a small contribution to the bulk modulus of elasticity of the hoop under small deformations of the hoop. However larger deformation of the hoop cause the slackened fibers to be pulled taut, whereupon, the tensile strength of the fibers is fully employed to resist further deformation, providing the hoop with an increased bulk modulus of elasticity.

The thermoplastic used in constructing the hoop 252 can also include a "dispersed phase" that is efficient to develop binding with the surrounding rubber. The "dispersed phase" can be described as a rubber formulator which will ensure sufficient adhesion with the tire rubber.

The hoop 252 can also incorporate reinforcing materials concentrated at or near the external surface of the hoop. The reinforcing materials are of the class of materials that include steel cords, glass, nylon, rayon, polyester, Flexten, Aramid, carbon fibers and combinations thereof. Layers of reinforcing material could be applied in the construction of the hoop 252 by winding a cord or strip made of several cords around the outer circumference of the hoop. The reinforcing materials would be bonded with the material of hoop 252 by processes appropriate to the materials, including for example and not by way of exclusion, the application of heat, pressure, ultraviolet light and other binding process such as are known to those familiar with the art.

Hoop Structure and Manufacturing Method

The hoop 252 can be made in a variety of ways, appropriate to the selected material and as generally known to those familiar with the art. For example, thermoplastic and UHMWPE can be molded or extruded with the desired cross-sectional shape and dimensions. The hoop 252 can also be formed by winding a flat strip of a material such as UHMWPE in a rubber or elastomeric matrix to build a hoop of the desired cross-sectional shape and dimensions. An example of such construction is shown and described with regard to FIG. 8 described hereinbelow. It will be obvious to those skilled in the art, that hoops with a variety of cross sectional shapes, including but not limited to rectangular, trapezoidal, triangular, lenticular and oblate shapes, can be made by selectively winding a thin strip of material of a suitably varying width.

The building drum (not shown) used to build the tires has the usual cylindrical shape, well known to one skilled in the art, with a groove in the middle of the drum. This groove has a shape adapted to receive the hoop 252 covered with the layer 254 of elastomeric transition material, so that the drum obtains its cylindrical shape when the belts are applied.

Referring to FIG. 2, a second inventive feature of the present invention is the use of the layer 254 of elastomeric transition or coupling material disposed between the hoop 252 and the adjacent material of the carcass structure 214, the belt structure 208 or the tread 202. The layer 254 serves to provide a flexible structural coupling between the hoop 252 and the carcass structure 214 and the belt structure 208. The thickness of the layer 254 measured from the radially outward surface of the hoop 252 to the radially inward surface of the adjacent structure is in the range of 0.5 to 3.0 mm, preferably from 0.5 to 1.0 mm. The layer 254 of elastomeric transition material should be made with a cross-sectional shape appropriate to supporting the hoop 252 and providing a transition or coupling from the cross-sectional shape of the hoop to the adjacent carcass structure 214 and belt structure 208.

As illustrated in FIG. 2, the single ply 218 of the carcass structure 214 has turnup ends 218a,218b which wrap about the bead cores 216a,216b, respectively and terminate in proximity to the radial location of the maximum section width SW of the tire 200. As the invention is more specifically directed to a tire crown reinforcement structure 248, the exact number of plies comprising the carcass structure, the specific layout of the beads or the way the carcass is anchored to the beads is of limited importance. The carcass structure 214 may incorporate one or more cord reinforced plies. Whereas the dynamic operation of the various embodiments of the hoop structure 250 as illustrated by FIGS. 5-9 are similar, the following description of dynamic operation will use the embodiment of hoop 252 described by FIG. 2 as an example of the inventive concept in general.

Dynamic Operation of the Preferred Embodiment

The hoop structure 250, as described above, provides structural strength and rigidity acting in combination with the carcass structure 214 and the belt structure 208 to increase the runflat performance and durability of the tire 200.

When the tire 200 is uninflated or underinflated, the weight of the vehicle is supported by the reinforced sidewalls 210,212 and the hoop structure 250 working in conjunction with the belt structure 208 and the carcass structure 214. The portion of the sidewalls 210,212 located most adjacent to the ground contacting portion of the tread 202 are loaded in compression during runflat operation.

Referring to FIG. 3, there is shown a schematic sectional view of the tire 200 as viewed through the equatorial plane. The compressive forces in the sidewalls are illustrated by a series of arrows 360 pointing radially inward and upward from the ground contacting portion of the tread 202 to the rim of the tire. The arrows 360 represent force vectors acting upon the tire. Similarly, a compressive load is imposed on the hoop structure 250. Referring again to FIG. 3, the compressive forces in the hoop 252 of hoop structure 250 are illustrated by a series of arrows 362 at the circumference of the hoop 252 pointing upward from the area where the tread 202 contacts the ground 364. The compressive force in the curved hoop 252 of hoop structure 250 results in upward and radially outward forces that are constrained by tension in the sidewalls 210,212 and in the belt structure 208 of the tire 200 that are not adjacent to the ground 364. These tensile forces are illustrated by a series of radially oriented double headed arrows 366.

The structural response of the hoop structure 250 in combination with the belt 208, carcass 214 and sidewall structures 210,212 provides an arrangement such that the load carrying capacity of the uninflated tire 200 can be maintained while giving minimum undesirable structural rigidity during normal inflated operation. The increased load carrying capacity provided by the hoop structure 250 reduces the load that must be carried by the reinforced sidewalls 210,212 thus allowing a reduction in the thickness, weight and rigidity of the sidewalls. Flexibility of the hoop structure 250 relative to the carcass structure 214 also allows the small levels of deformation typically encountered during normally inflated operation to be accommodated without degrading the ride quality.

FIG. 4 shows a schematic cross sectional view of the tire 200 mounted on a wheel 470. The compressive forces in the hoop structure 250 are illustrated by a series of arrows 472 originating where the forces are transmitted to the hoop 252 from the tread 202 where it contacts the ground 364. The arrows 472 show the compressive forces continuing upward to the topmost part of the hoop 252. As shown in FIG. 4, the hoop 252 imposes a concentrated upward force midway between the lateral edges of the tread 202 at the top of the tire 200. This concentrated force is distributed by the interaction of the layer 254 of elastomeric transition material, the adjacent carcass structure 214, and the belt structure 208 acting as a flexible beam linking the compression-bearing hoop 252 with the tension-bearing carcass plies 218 in the sidewalls 210,212.

The interaction of the hoop 252 with the reinforced sidewalls 210,212 reduces the tendency of the central portion of the tread 202 in the area of the footprint to buckle upward during runflat operation. As noted above in reference to FIG. 4, a compressive force is imposed in the hoop 252 where the tread 202 contacts the ground 364. In the area of the footprint, the hoop 252 bears down on the tread 202 midway between the edges of tread 202 with a force that tends to be concentrated at the leading and trailing edges of the tread. The hoop 252, being of a solid material, behaves as a beam and distributes the concentrated forces over the length of the hoop along the center of the footprint. Thus the hoop resists the tendency of the tread to buckle upward at the center of the footprint during runflat operation.

In addition, the hoop structure 250 comprising the hoop 252 and the layer 254 of elastomeric transition material, the carcass structure 214 and the belt structure 208 can also be compared to an I-beam where the belt structure forms one flange, the hoop 252 forms the other flange and the intervening layer 254 of elastomeric material and carcass structure 214 form the web. This I-beam like structure also resists tread buckling during runflat operation and enhances the compression-bearing strength of the hoop structure over the entire circumference of the tire.

By resisting the tendency of the tread 202 to buckle upward at the center of the footprint during runflat operation, the hoop 252 also contributes to the strength and stiffness of the sidewalls 210,212. Referring to FIG. 2, the crescent shaped inserts 224a,224b located in the sidewalls 210,212, respectively, extend under the lateral edges of the belt structure 208 providing structural continuity between the sidewalls 210,212, the belt structure 208 and the hoop 252. In particular, the shoulder regions of the tire, where the sidewalls curve to meet the edge of the tread 202, is given bending stiffness by the underlying crescent shaped inserts 224a,224b. Since the hoop 252 constrains the radially inward movement of the carcass structure at the center of the footprint, the bending stiffness of the adjoining shoulder region of the sidewall can more effectively resist the tendency of the sidewalls 210,212 to buckle outward during runflat operation. Thus the thickness and weight of the sidewall inserts 224a,224b can be reduced for a given runflat load-carrying capacity.

Inventive Concept in Relation to Prior Art

The inventive features of the present invention in relation to the prior art comprise a crown reinforcement structure 248 including a hoop 252 and a layer 254 of elastomeric transition material to form a rigid compression-bearing hoop structure 250. The hoop 252 is located radially outward of the carcass structure 214 more or less at the equatorial plane E-P of the tire 200. The hoop 252 is located adjacent to and radially inward of both the belt structure 208 the tread 202. The hoop 252 is a thermoplastic, free of reinforcement cords and structurally coupled by the layer 254 of elastomeric transition material to the adjacent structures and works with the insert reinforced sidewalls 210,212 to distribute the stresses of runflat operation and extend the runflat capability of the tire 200. The combination of the hoop 252 and the layer 254 of elastomeric transition material, with insert reinforced sidewalls 210,212 also allows the tire to be designed with the flexibility required for good handling and a smooth ride during both normal inflated and runflat operation.

The use of a compression-bearing annular element to provide runflat capability is not unknown. The "Banded Tire" described in U.S. Pat. No. 4,111,249 ('249) provides an example of using a thin band extending the width of the tread and stabilized by a radial ply sidewall construction. The present invention, except for the embodiment illustrated in FIG. 7, discussed hereinafter, contemplates a hoop structure 250 extending not more than 50% of the tread width because more would create a tire that is too stiff. The hoop structure 250 is indirectly coupled to the radial plies of the sidewall though a layer 254 of elastomeric transition material providing a flexible connection between hoop and the radial ply sidewall construction. The flexibility provided by this inventive feature allows the use of a hoop with significant thickness in the radial dimension providing an intrinsically rigid and durable supporting structure. The combination of the hoop 252 with a flexible connection to carcass structure 214 and belt structures 208 of the tire 200 provides benefits of flexibility for a good handling and ride quality during normal operation and increased durability with good handling and ride quality during runflat operation. The present invention also combines and incorporates the hoop structure 250 within a tire 200 having one or more inserts 224a,224b to provide a robust runflat structure whereas the '249 patent relies on the annular band as the sole source of support during runflat operation.

Another innovative feature of the present invention is the use of a range of innovative solid and composite materials and methods of construction for the hoop structure 250 that are substantially different from the methods and materials that are normally considered for the construction hoop-like elements. One approach described in the prior art is to make a hoop-like element made of materials and by a process typically used for conventional bead cores. For example, referring to FIG. 1 the third bead core 130 as described by the '927 patent is a hoop-like element made of a number of high tensile steel wires consistent with conventional bead core construction. Although the '927 patent notes that the tread bead core 130 can be made of any number of materials or cross sectional shapes, no alternative constructions are described except for variations of conventional bead core methods and materials.

Embodiment One

Referring to FIG. 2 there is illustrated the first embodiment of the present invention.

The hoop structure 250 includes a lenticular-shaped hoop 252 of a thermoplastic material filled with reinforcing glass fibers having a cross-sectional width of 10% to 25% of the tread width tw measured in an axial direction and thickness of 10% to 50% of the width w of the hoop 252. The shape of the hoop 252 and its location are both symmetrical with respect to the equatorial plane EP.

The layer 254 of elastomeric transition coating surrounds the hoop 252 and provides the transition between the hoop 252 and the adjacent belt structure 208 and carcass structure 214. The layer 254 of elastomeric transition coating comprises an elastomeric material selected for a good bonding strength with the material of the hoop 252 and the adjacent materials of the carcass structure 214 and the belt structure 208. The layer 254 of elastomeric transition coating also has structural properties of elasticity and strength providing for a uniform distribution of forces between the hoop 252 and the surrounding carcass structure 214 and belt structure 208. The layer 254 of elastomeric transition material also has a thickness of between 0.5 and 3.0 mm.

Embodiment Two

Referring to FIG. 5 there is illustrated a second embodiment of the present invention. As shown, the hoop structure 570 has a hoop 572 with a complex cross-sectional shape comprising two thickened sections or lobes 572a,572b joined by a thin waist-like section 572c and a transition coating layer 574 (compare 254). The hoop structure 570 is constructed of the same types of material and processes used with hoop structure 250, described hereinbefore. Only a section of the tire 500 incorporating hoop structure 570 is illustrated, since the remainder of the tire 500 is substantially the same as tire 200 described before. In general, hoop structure 570 comprises a thermoplastic material filled with reinforcing glass fibers. The hoop 572 has a cross-sectional width W of between 10% and 25% of the tread 502 width measured in the axial direction and a thickness of 10% to 50% of the width of the hoop measured in the axial direction. The shape of the hoop 572 and its location are both symmetrical with respect to the equatorial plane EP. The hoop structure 570 is located radially outward of the carcass structure 514 (compare 214) and radially inward of the belt structure 508 (compare 208). The belt structure 508 and the carcass structure 514 as well as the other structures and elements of the tire are essentially the same as in the first embodiment shown in FIG. 2.

Embodiment Three

Referring to FIG. 6 there is illustrated a third embodiment of the present invention wherein a tire 600, which is essentially the same as tire 200 except for the hoop structure 675, replaces hoop structure 250. As shown, the hoop structure 675 includes a hoop 677 that, although generally lenticular in shape, is asymmetric in cross-sectional shape and location relative to the equatorial plane. The hoop 677 has a thickened section or lobe 677a substantially to one side of the equatorial plane EP and a thinner section 677b substantially to the opposite side the equatorial plane. The hoop structure 675 comprises a hoop 677 of thermoplastic material filled with reinforcing fibers. The hoop 677 has a cross-sectional width of between 10% and 50% of the width of tread 602 (compare 202) in the axial direction. The thickness of hoop section 677a is more than twice the width of the section 677b of hoop 677 measured in the axial direction. The hoop 677 is located radially outward of the carcass structure and radially inward of the belt structure 608. The belt structure 608 and the carcass structure 614 as well as the other structures and elements of the tire 600 are essentially the same as tire 200 in the first embodiment.

Embodiment Four

Referring to FIG. 7 there is illustrated a fourth embodiment of the present invention where a hoop structure 780 is used in a tire 700 that does not have a conventional belt structure. As shown, the hoop structure 780 extends radially inward of the tread 702 and radially outward of the carcass structure 714. The hoop structure 780 provides the function of the belt structure in addition to providing the tire 700 with extended runflat capability. The hoop structure 780 comprises a hoop 782 of thermoplastic material filled with reinforcing fibers as described above regarding hoop 252. The hoop 782 has a cross-sectional width of 90% to 100% of the width of tread 702 measured in the axial direction and a thickness of 2.0% to 5.0% of the hoop width. The layer 784 of elastomeric transition material couples the radially outward surface of the hoop 780 with the adjacent tread 702 and the radially inward surface of the hoop 782 with the carcass structure 714. The carcass structure 714 (compare 214) as well as the other structures and elements of the tire except for the belt structure, which is replaced by the hoop structure 782, are essentially the same as in the first embodiment.

Embodiment Five

Referring to FIG. 8 there is illustrated a fifth embodiment of the present invention. As shown, the hoop structure 880 is made by spirally winding layers 882a,882b,882c,882d, 882e of a flat strip 882 of material where the width of the flat strip 882 is equal or less than the width of the widest layer 882a. A hoop 880 formed by spirally winding such a strip 882 will have a generally trapezoidal shape in cross section where the width of the larger base 882a of the trapezoid is equal to the width of the strip 882 at its wide end and the width of the smaller base 882e of the trapezoid likewise corresponds to the width of strip 882 at its narrow end. It is within the scope of the invention to incorporate a layer of elastomeric material between the layers 882a-882e of the hoop. The entire hoop structure 880 is in an elastomeric, (i.e. rubber), matrix 884 located radially outward of the carcass structure 814 and radially inward of the belt structure 808. The belt structure 808 and the carcass structure 814 (compare 214) as well as the other structures and elements of the tire are essentially the same as in the first embodiment. The advantage of this embodiment is that it is very flexible as to the dimensions, shapes and treatment needed to construct hoop structure 880.

Embodiment Six

Though in the embodiments represented in FIGS. 2,5,6,7 and 8 only one hoop has been included in the tire design, it lies within the scope of the invention to use two or more hoops located symmetrically or asymmetrically with respect to the equatorial plane, as shown in FIG. 9 where the hoop structure 980 is made of a plurality of flat hoops 982a,982b, 982c,982d,982e of a strips of material. Hoop 980 is shown with a generally trapezoidal shape, however, it is within the scope of the invention to provide any desired shape. It is within the scope of the invention to incorporate a layer of elastomeric material between the layers 982a-982e of the hoop. Moreover, the entire hoop structure 980 is in an elastomeric, (i.e. rubber), matrix 984 located radially outward of the carcass structure 914 and radially inward of the belt structure 908. The belt structure 908 and the carcass structure 914 (compare 214) as well as the other structures and elements of the tire are essentially the same as in the first embodiment. The advantage of this embodiment is that it is very flexible as to the dimensions, shapes and treatment needed to construct hoop structure 880. The use of two or more hoops is especially of interest for very low aspect ratio tires. The use of asymmetrical hoop placement is of particular interest for vehicles where the tire is mounted with a significant camber. For example, when two or more hoops are included in the tire design, they may be symmetrically or asymmetrically located with respect to the equatorial plane, depending on the camber of the tire once mounted on the car.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic radial ply tire having a tread, a carcass structure, a belt structure, two inextensible annular beads, at least one radial ply and sidewalls, a crown reinforcement structure located on the equatorial plane and disposed radially inward from the belt structure and radially outward from the carcass structure, said tire characterized by:
   the tire being a runflat tire with the carcass structure including sidewall inserts disposed in the sidewalls;
   the crown reinforcement structure comprising a hoop structure constructed from the group of materials consisting of thermoplastics, ultra-high-molecular-weight polyethylene and epoxy resin composites filled with reinforcement fibers;
   the hoop structure having a width that is between 10% and less than 20% of the width of the tread;
   the hoop structure includes a continuous, thermoplastic hoop embedded in a coating layer of an elastomeric coating material comprising a rubber compound having a Shore A hardness between 45 and 80 that couples the hoop to the belt structure and the carcass structure; and
   the coating layer having a thickness in the range of 0.5 to 3.0 mm and being disposed between the hoop and adjacent material of the carcass structure and belt structure.

2. The tire of claim 1 characterized in that the hoop structure is of a solid thermoplastic filled with reinforcement fibers.

3. The tire of claim 2 characterized in that the reinforcement fibers are from the group of high modulus materials consisting of steel, glass, nylon, rayon, polyester, aramid, carbon fibers and mixtures thereof.

4. The tire of claim 1 characterized in that the hoop structure is located symmetrically with respect to the equatorial plane of the tire.

5. The tire of claim 4 characterized in that the hoop structure has a substantially lenticular cross sectional shape.

6. The tire of claim 4 characterized in that the hoop structure has a cross-sectional shape comprised of two lobes joined by a thin section waist-like section.

7. The tire of claim 1 characterized in that the hoop structure is located asymmetrically with respect to the equatorial plane of the tire.

8. The tire of claim 7 characterized in that the hoop structure has a hoop with a cross sectional shape of a thickened section to one side of the equatorial plane and a thinner section to the opposite side the equatorial plane.

9. The tire of claim 1 characterized in that the thermoplastic hoop is constructed of thin wound layers of a strip of ultra high molecular weight polyethylene in an elastomeric matrix.

10. The tire of claim 1 characterized in that the reinforcement fibers are laid in a slackened state such that the fibers make only a small contribution to the bulk modulus of elasticity under small deformation of the thermoplastic hoop while larger deformations of the hoop cause the fibers to be pulled taut providing an increased bulk modulus of elasticity.

11. The tire of claim 1 characterized in that the hoop structure is coupled with the belt structure by a layer comprising a rubber compound having a Shore A hardness between 65 and 75.

* * * * *